US011487648B2

(12) United States Patent
Amin et al.

(10) Patent No.: US 11,487,648 B2
(45) Date of Patent: Nov. 1, 2022

(54) SYSTEM AND METHOD FOR FULLY INTEGRATED REGRESSION AND SYSTEM TESTING ANALYTICS

(71) Applicant: JPMorgan Chase Bank, N.A., New York, NY (US)

(72) Inventors: Mohammed Amin, Dorset (GB); Tushar Ramesh Gulhane, Dorset (GB); Neeraj Bajpai, New Malden (GB); Greg Waters, Wappingers Falls, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/196,426

(22) Filed: Mar. 9, 2021

(65) Prior Publication Data

US 2022/0292012 A1 Sep. 15, 2022

(51) Int. Cl.
*G06F 9/44* (2018.01)
*G06F 11/36* (2006.01)
*G06F 11/34* (2006.01)
*G06F 11/32* (2006.01)

(52) U.S. Cl.
CPC ........ *G06F 11/3688* (2013.01); *G06F 11/324* (2013.01); *G06F 11/3476* (2013.01); *G06F 11/3676* (2013.01); *G06F 11/3684* (2013.01); *G06F 11/3692* (2013.01)

(58) Field of Classification Search
None
See application file for complete search history.

(56) References Cited

U.S. PATENT DOCUMENTS

| 10,713,151 | B1* | 7/2020 | Zinger | G06F 11/3684 |
| 2004/0025088 | A1* | 2/2004 | Avvari | G06F 11/3676 714/38.13 |
| 2008/0250051 | A1* | 10/2008 | Grechanik | G06F 11/368 707/999.102 |
| 2020/0379886 | A1* | 12/2020 | Potter | G06F 11/3676 |
| 2021/0279577 | A1* | 9/2021 | West | G06N 3/0445 |

OTHER PUBLICATIONS

Official Communication Received in PCT Application No. PCT/US2022/019447, dated Apr. 14, 2022.

* cited by examiner

*Primary Examiner* — Qamrun Nahar
(74) *Attorney, Agent, or Firm* — Greenblum & Bernstein, P.L.C.

(57) ABSTRACT

Various methods, apparatuses/systems, and media for automatically generating fully integrated regression and system testing (FIRST) analytics are disclosed. A processor accesses a production database to obtain production data associated with an application, and accesses a user acceptance testing (UAT) database to obtain UAT data associated with the application. The processor generates gap data on test coverage based on comparing the production data with the UAT data; analyzes the generated gap data; automatically generates, in response to analyzing the generated gap data, executable full coverage of test scenarios for testing the application; and automatically executes testing of the application based on the generated test scenarios.

20 Claims, 5 Drawing Sheets

SYSTEM AND METHOD FOR FULLY INTEGRATED REGRESSION AND SYSTEM TESTING ANALYTICS

TECHNICAL FIELD

This disclosure generally relates to software testing, and, more particularly, to methods and apparatuses for implementing a data analytics and test automation module for automatically generating fully integrated regression and system testing (FIRST) analytics, thereby significantly reducing STLC (Software Testing Life Cycle) duration.

BACKGROUND

As software application becomes increasingly more complex, generating tests and testing such software application based on the tests also become more complex as a large number of unique combinations of paths and modules may be tested for each program. Conventional tools exist for generating tests for software application testing which generally require a significant amount of manual effort. Automation is an important aspect in any application development and maintenance and at the same time it is also time consuming to write scripts and maintain those. For example, regression testing a software application often requires thousands of man hours to maintain the scripts and keep them in-synch with new development as the product evolves.

In addition, typical test lifecycles may fail to cover complex end to end flows across different line of businesses; require manual effort to identify all critical business scenarios and test cases creation; and require lengthy test duration and manual testing efforts to support business releases. Thus, typical test lifecycles may suffer from the following disadvantages: lengthy cycles due to manual requirements and test analysis; non optimized test cases due to hand crafted tests and data; reliance on too many teams to gather test artefacts.

SUMMARY

The present disclosure, through one or more of its various aspects, embodiments, and/or specific features or sub-components, provides, among other features, various systems, servers, devices, methods, media, programs, and platforms for implementing a data analytics and test automation module that provides a unified test automation framework thereby reducing the need for multiple tools to support applications developed in diverse technology platforms; supports end to end UAT (User Acceptance Testing), regression and non-functional testing, requirements and test coverage analysis (also referred as fingerprinting); facilitates fully automated test cases creation and data artefacts generation based on production events captured from pre-production environment, and thereby significantly reducing STLC duration, but the disclosure is not limited thereto.

For example, the present disclosure, through one or more of its various aspects, embodiments, and/or specific features or sub-components, also provides, among other features, various systems, servers, devices, methods, media, programs, and platforms for implementing a data analytics and test automation module that utilizes data analytics (fingerprint) on historical production data to identify unique set of inputs for constructing test cases, aligns fingerprinted tests with a test automation framework; and utilizes this approach on a continuous basis to keep the test cases optimized, and maintains test coverage at par with production with minimal efforts (i.e., core part of FIRST analytics is re-usable across business domains), but the disclosure is not limited thereto.

According to an aspect of the present disclosure, a method for automatically generating fully integrated regression and system testing (FIRST) analytics by utilizing one or more processors and one or more memories is disclosed. The method may include: accessing a production database to obtain production data associated with an application; accessing a user acceptance testing (UAT) database to obtain UAT data associated with the application; generating gap data on test coverage based on comparing the production data with the UAT data; analyzing the generated gap data; automatically generating, in response to analyzing the generated gap data, executable full coverage of test scenarios for testing the application; and automatically executing testing of the application based on the generated test scenarios.

According to another aspect of the present disclosure, the method may further include: implementing data analytics algorithm on historical production data to identify unique set of input data, received from a client device, that represents a consumer's point of view for utilization of the application, for automatically generating the full coverage of test scenarios.

According to yet another aspect of the present disclosure, the method may further include: implementing the data analytics algorithm on the historical production data to identify unique set of input data; and implementing the identified unique set of input data for re-platforming, migrating, and regression testing of the application.

According to a further aspect of the present disclosure, the method may further include: aligning the full coverage of test scenarios with a test automation framework; and automatically executing end-to-end UAT and regression testing of the application based on the test scenarios.

According to an additional aspect of the present disclosure, the method may further include: aligning the full coverage of test scenarios with a test automation framework; and automatically executing end-to-end non-functional testing of the application based on the test scenarios.

According to a further aspect of the present disclosure, wherein the production data may be defined and collected in view of input data, received from a client device, the input data representing a consumer's point of view for utilization of the application.

According to yet another aspect of the present disclosure, the method may further include: implementing a graphical user interface (GUI); and displaying the generated test scenarios and the generated gap data in test coverage onto the GUI.

According to another aspect of the present disclosure, the method may further include: automatically generating test cases and data artefacts based on production events data captured from pre-production environment of a continuous integration continuous delivery pipeline.

According to a further aspect of the present disclosure, a system for automatically generating fully integrated regression and system testing (FIRST) analytics is disclosed. The system may include a production database having one or more memories for storing production data associated with an application; a user acceptance testing (UAT) database having one or more memories for storing UAT data associated with the application; and a processor operatively connected to the production database and the UAT database via one or more communication networks. The processor may be configured to: access the production database to obtain production data associated with an application; access the user acceptance testing (UAT) database to obtain UAT data associated with the application; generate gap data on test coverage based on comparing the production data with the UAT data, analyze the generated gap data; automatically generate, in response to analyzing the generated gap data, executable full coverage of test scenarios for testing the application; and automatically execute testing of the application based on the generated test scenarios.

According to another aspect of the present disclosure, wherein the processor may be further configured to: implement data analytics algorithm on historical production data to identify unique set of input data, received from a client device, that represents a consumer's point of view for utilization of the application, for automatically generating the full coverage of test scenarios.

According to yet another aspect of the present disclosure, wherein the processor may be further configured to: implement the data analytics algorithm on the historical production data to identify unique set of input data; and implement the identified unique set of input data for re-platforming, migrating, and regression testing of the application.

According to a further aspect of the present disclosure, wherein the processor may be further configured to: align the full coverage of test scenarios with a test automation framework; and automatically execute end-to-end UAT and regression testing of the application based on the test scenarios.

According to yet another aspect of the present disclosure, wherein the processor may be further configured to: implement a graphical user interface (GUI); and display the generated test scenarios and the generated gap data in test coverage onto the GUI.

According to a further aspect of the present disclosure, wherein the processor may be further configured to: automatically generate test cases and data artefacts based on production events data captured from pre-production environment of a continuous integration continuous delivery pipeline.

According to an aspect of the present disclosure, a non-transitory computer readable medium configured to store instructions for automatically generating fully integrated regression and system testing (FIRST) analytics is disclosed. The instructions, when executed, may cause a processor to perform the following: accessing a production database to obtain production data associated with an application; accessing a user acceptance testing (UAT) database to obtain UAT data associated with the application; generating gap data on test coverage based on comparing the production data with the UAT data; analyzing the generated gap data; automatically generating, in response to analyzing the generated gap data, executable full coverage of test scenarios for testing the application and automatically executing testing of the application based on the generated test scenarios.

According to an aspect of the present disclosure, the instructions, when executed, may further cause the processor to perform the following: implementing data analytics algorithm on historical production data to identify unique set of input data, received from a client device, that represents a consumer's point of view for utilization of the application, for automatically generating the full coverage of test scenarios.

According to a further aspect of the present disclosure, the instructions, when executed, may further cause the processor to perform the following: implementing the data analytics algorithm on the historical production data to identify unique set of input data; and implementing the identified unique set of input data for re-platforming, migrating, and regression testing of the application.

According to a further aspect of the present disclosure, the instructions, when executed, may further cause the processor to perform the following: align the full coverage of test scenarios with a test automation framework; and automatically execute end-to-end UAT and regression testing of the application based on the test scenarios.

According to another aspect of the present disclosure, the instructions, when executed, may further cause the processor to perform the following: implement a graphical user interface (GUI); and display the generated test scenarios and the generated gap data in test coverage onto the GUI.

According to a further aspect of the present disclosure, the instructions, when executed, may further cause the processor to perform the following: automatically generate test cases and data artefacts based on production events data captured from pre-production environment of a continuous integration continuous delivery pipeline.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
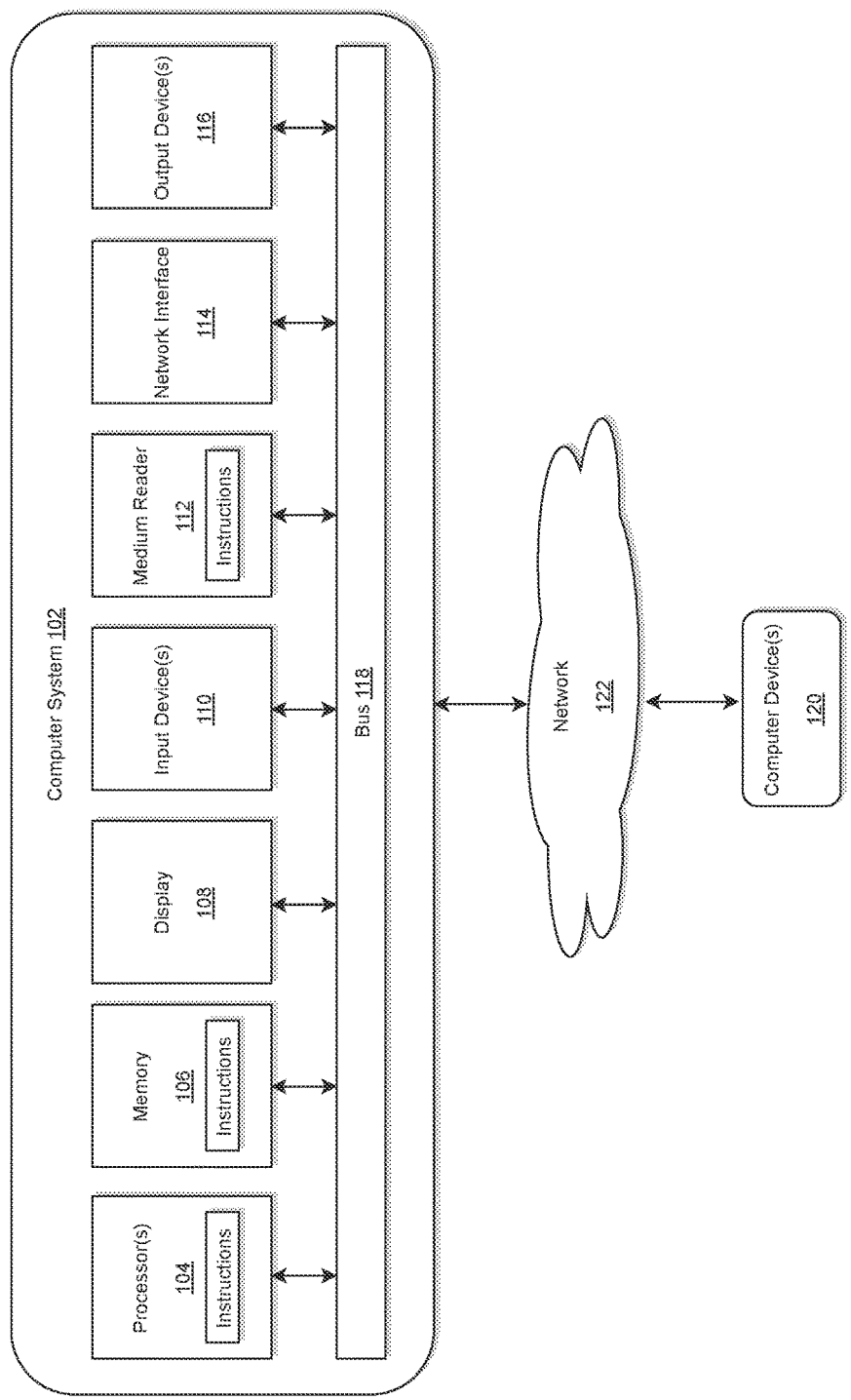
FIG. 1 illustrates a computer system for automatically generating fully integrated regression and system testing (FIRST) analytics in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, engines, units and/or modules. Those skilled in the art will appreciate that these blocks, engines, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, engines, units and/or modules being implemented by microprocessors or similar, they may be programmed using software (e.g., microcode) to perform various functions discussed herein and may optionally be driven by firmware and/or software. Alternatively, each block, engine, unit and/or module may be implemented by dedicated hardware, or as a combination of dedicated hardware to perform some functions and a processor (e.g., one or more programmed microprocessors and associated circuitry) to perform other functions. Also, each block, engine, unit and/or module of the example embodiments may be physically separated into two or more interacting and discrete blocks, engines, units and/or modules without departing from the scope of the inventive concepts. Further, the blocks, engines, units and/or modules of the example embodiments may be physically combined into more complex blocks, engines, units and/or modules without departing from the scope of the present disclosure.

FIG. 1 is an exemplary system 100 for use in implementing a data analytics and test automation module for automatically generating fully integrated regression and system testing (FIRST) analytics in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a data analytics and test automation module that provides a unified test automation framework thereby reducing the need for multiple tools to support applications developed in diverse technology platforms; supports end to end UAT (User Acceptance Testing), regression and non-functional testing, requirements and test coverage analysis (also referred as fingerprinting); facilitates fully automated test cases creation and data artefacts generation based on production events captured from pre-production environment, and thereby significantly reducing STLC duration, but the disclosure is not limited thereto. For example, as described herein, various embodiments provide optimized processes of implementing a data analytics and test automation module that utilizes data analytics (fingerprint) on historical production data to identify unique set of inputs for constructing test cases, aligns fingerprinted tests with a test automation framework; and utilizes this approach on a continuous basis to keep the test cases optimized, and maintains test coverage at par with production with minimal efforts (i.e., core part of FIRST analytics is re-usable across business domains), but the disclosure is not limited thereto.

Figure 2:
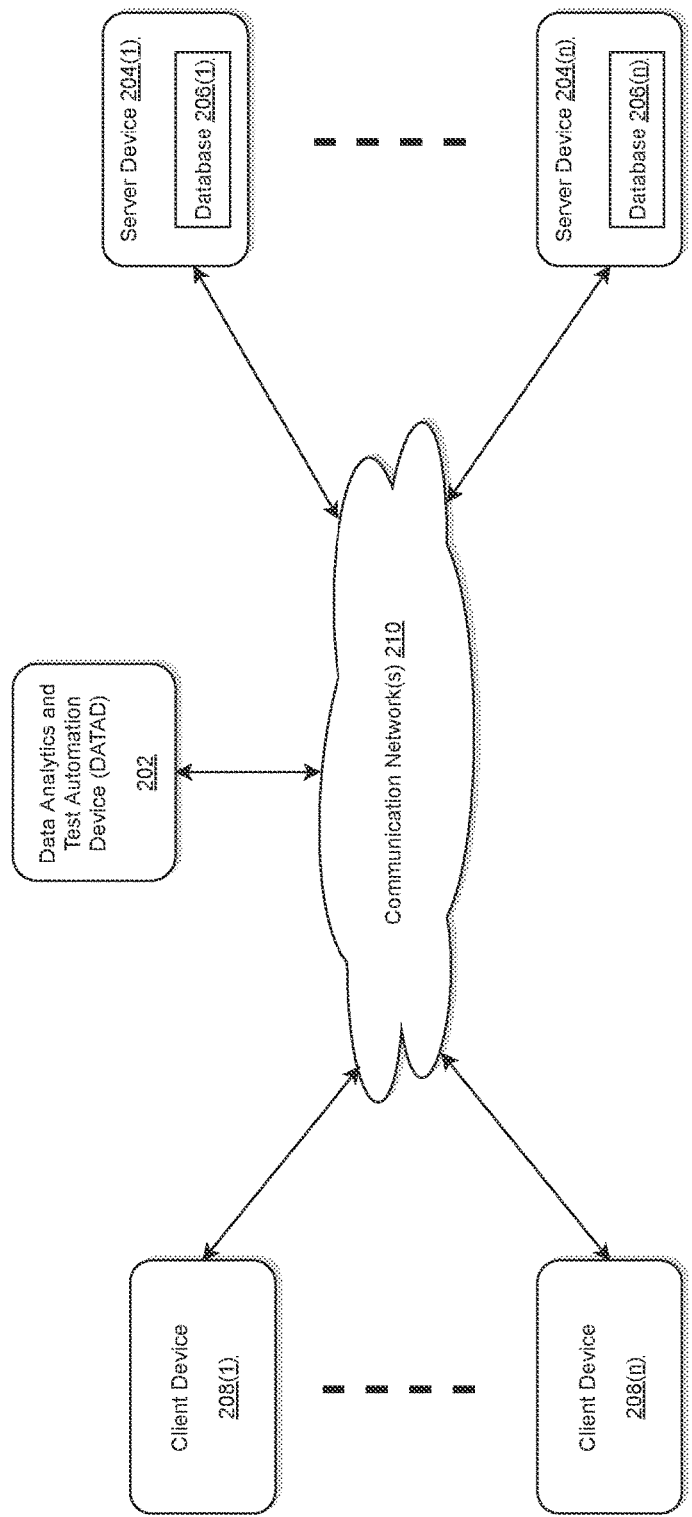
FIG. 2 illustrates an exemplary diagram of a network environment with a data analytics and test automation device in accordance with an exemplary embodiment.

Referring to FIG. 2, a schematic of an exemplary network environment 200 for implementing a data analytics and test automation (DATAD) of the instant disclosure is illustrated.

According to exemplary embodiments, the above-described problems associated with conventional method and systems may be overcome by implementing an DATAD 202 as illustrated in FIG. 2 by implementing a data analytics and test automation module that provides a unified test automation framework thereby reducing the need for multiple tools to support applications developed in diverse technology platforms; supports end to end UAT (User Acceptance Testing), regression and non-functional testing, requirements and test coverage analysis (also referred as fingerprinting); facilitates fully automated test cases creation and data artefacts generation based on production events captured from pre-production environment, and thereby significantly reducing STLC duration, but the disclosure is not limited thereto.

The DATAD 202 may be the same or similar to the computer system 102 as described with respect to FIG. 1.

The DATAD 202 may store one or more applications that can include executable instructions that, when executed by the DATAD 202, cause the DATAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DATAD 202 itself, may be located in virtual server(s) running in a cloud-based computing environment rather than being tied to one or more specific physical network computing devices. Also, the application(s) may be running in one or more virtual machines (VMs) executing on the DATAD 202. Additionally, in one or more embodiments of this technology, virtual machine(s) running on the DATAD 202 may be managed or supervised by a hypervisor.

In the network environment 200 of FIG. 2, the DATAD 202 is coupled to a plurality of server devices 204(1)-204(n) that hosts a plurality of databases 206(1)-206(n), and also to a plurality of client devices 208(1)-208(n) via communication network(s) 210. A communication interface of the DATAD 202, such as the network interface 114 of the computer system 102 of FIG. 1, operatively couples and communicates between the DATAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DATAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DATAD 202 may be a standalone device or integrated with one or more other devices or apparatuses, such as one or more of the server devices 204(1)-204(n), for example. In one particular example, the DATAD 202 may be hosted by one of the server devices 204(1)-204(n), and other arrangements are also possible. Moreover, one or more of the devices of the DATAD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DATAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DATAD 202 that may be configured for implementing a data analytics and test automation module that provides a unified test automation framework thereby reducing the need for multiple tools to support applications developed in diverse technology platforms; supports end to end UAT (User Acceptance Testing), regression and non-functional testing, requirements and test coverage analysis (also referred as fingerprinting); facilitates fully automated test cases creation and data artefacts generation based on production events captured from pre-production environment, and thereby significantly reducing STLC duration, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the DATAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DATAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DATAD 202, the server devices 204(1)-204(n), or the client devices 208(1)-208(n), for example, may be configured to operate as virtual instances on the same physical machine. For example, one or more of the DATAD 202, the server devices 204(1)-204(n), or the client devices 208(1)-208(n) may operate on the same physical device rather than as separate devices communicating through communication network(s) 210. Additionally, there may be more or fewer DATADs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
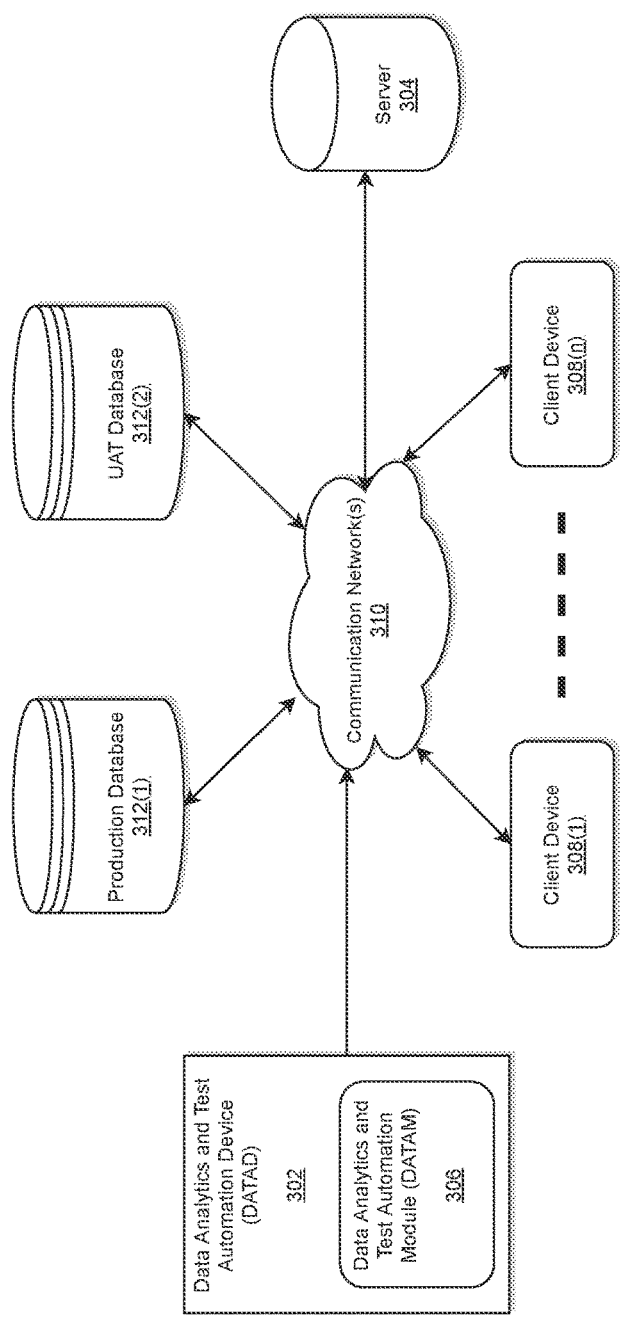
FIG. 3 illustrates a system diagram for implementing a data analytics and test automation device with a data analytics and test automation module in accordance with an exemplary embodiment.

FIG. 3 illustrates a system diagram for implementing a DATAD 302 with a data analytics and test automation module (DATAM) 306 in accordance with an exemplary embodiment.

As illustrated in FIG. 3, the DATAD 302 including the DATAM 306 may be connected to a server 304, a production database 312(1), and a UAT database 312(2) via a communication network 310. The DATAD 302 may also be connected to a plurality of client devices 308(1)-308(n) via the communication network 310, but the disclosure is not limited thereto. According to exemplary embodiments, the DATAM 306 may be implemented within the client devices 308(1)-308(n), but the disclosure is not limited thereto. According to exemplary embodiments, the client devices 308(1)-308(n) may be utilized for FIRST analytics and automatic testing, but the disclosure is not limited thereto.

According to exemplary embodiment, the DATAD 302 is described and shown in FIG. 3 as including the DATAM 306, although it may include other rules, policies, modules, databases, or applications, for example. According to exemplary embodiments, the production database 312(1) and the UAT database 312(2) may be embedded within the DATAD 302. Although only one production database 312(1) and one UAT database 312(2) are illustrated in FIG. 3, according to exemplary embodiments, a plurality of databases may be provided. According to exemplary embodiments, the production database 312(1) may include one or more memories configured to store production data associated with an application and the UAT database 312(2) may include one or more memories configured to store UAT data associated with the application, but the disclosure is not limited thereto. According to exemplary embodiments, other databases, not shown, may include one or memories to store login information, data files, data content, API specification definition file, user profile data, user profile attributes data, attribute definitions of users, etc., but the disclosure is not limited thereto. According to exemplary embodiments, the DATAM 306 may be configured to be storage platform agnostic—configured to be deployed across multiple storage layers.

According to exemplary embodiments, the DATAM 306 may be configured to receive continuous feed of data from the production database 312(1) and the UAT database 312(2) and the server 304 via the communication network 310.

According to exemplary embodiments, the DATAM 306 may be configured to receive continuous feed of data from the production database 312(1), UAT database 312(2) and the server 304 via the communication network 310. According to exemplary embodiments, the production database 312(1) and the UAT database 312(2) may also be a private cloud-based database that supports user authentication, database security, and integration with existing databases and developments as well as stores open API specification definition file (i.e., in JSON format) corresponding to an application, but the disclosure is not limited thereto.

As will be described below, the DATAM 306 may be configured to: access the production database 312(1) to obtain production data associated with an application; access the UAT database 312(2) to obtain UAT data associated with the application; generate gap data on test coverage based on comparing the production data with the UAT data; analyze the generated gap data; automatically generate, in response to analyzing the generated gap data, executable full coverage of test scenarios for testing the application; and automatically execute testing of the application based on the generated test scenarios, but the disclosure is not limited thereto.

The plurality of client devices 308(1)-308(n) are illustrated as being in communication with the DATAD 302. In this regard, the plurality of client devices 308(1)-308(n) may be "clients" of the DATAD 302 and are described herein as such. Nevertheless, it is to be known and understood that the plurality of client devices 308(1)-308(n) need not necessarily be "clients" of the DATAD 302, or any entity described in association therewith herein. Any additional or alternative relationship may exist between either or more of the plurality of client devices 308(1)-308(n) and the DATAD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the DATAD 302 via broadband or cellular communication. Of course, these embodiments are merely exemplary and are not limiting or exhaustive.

Figure 4:
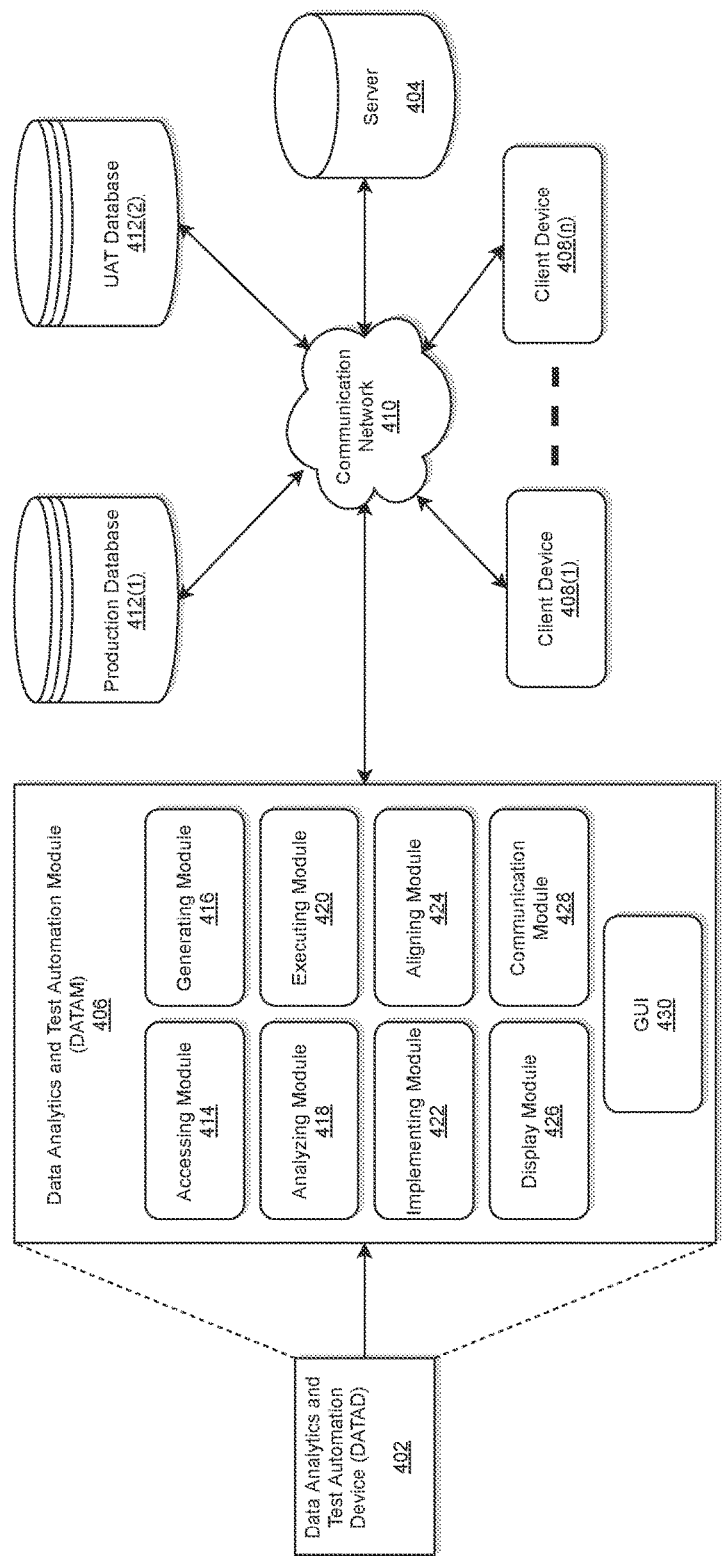
FIG. 4 illustrates a system diagram for implementing a data analytics and test automation module of FIG. 3 in accordance with an exemplary embodiment.

FIG. 4 illustrates a system diagram for implementing a DATAM of FIG. 3 in accordance with an exemplary embodiment.

As illustrated in FIG. 4, the system 400 may include a DATAD 402 within which a DATAM 406 may be embedded, a production database 412(1), a UAT database 412(2), a server 404, client devices 408(1)-408(n), and a communication network 410. According to exemplary embodiments, the DATAD 402, DATAM 406, production database 412(1) and the UAT database 412(2), the server 404, the client devices 408(1)-408(n), and the communication network 410 as illustrated in FIG. 4 may be the same or similar to the DATAD 302, the DATAM 306, the production database 312(1) and the UAT database 312(2), the server 304, the client devices 308(1)-308(n), and the communication network 310, respectively, as illustrated in FIG. 3.

According to exemplary embodiments, although only one production database 412(1) and one UAT database 412(2) are illustrated in FIG. 4, according to exemplary embodiments, a plurality of other databases may be provided. According to exemplary embodiments, the production database 412(1) may include one or more memories configured to store production data associated with an application and the UAT database 412(2) may include one or more memories configured to store UAT data associated with the application, but the disclosure is not limited thereto. According to exemplary embodiments, other databases, not shown, may include one or memories to store login information, data files, data content, API specification definition tile, user profile data, user profile attributes data, attribute definitions of users, etc., but the disclosure is not limited thereto.

According to exemplary embodiments, the DATAM 406 may be configured to be storage platform agnostic—configured to be deployed across multiple storage layers.

As illustrated in FIG. 4, the DATAM 406 may include an accessing module 414, a generating module 416, an analyzing module 418, an executing module 420, an implementing module 422, an aligning module 424, a display module 426, a communication module 428, and a GUI 430.

According to exemplary embodiments, the production database 412(1) and the UAT database 412(2) may be external to the DATAD 402 may include various systems that are managed and operated by an organization. Alternatively, according to exemplary embodiments, the production database 412(1) and the UAT database 412(2) may be embedded within the DATAD 402 and/or within the DATAM 406.

According to exemplary embodiments, the DATAM 406 may be implemented via user interfaces, e.g., web user interface, but the disclosure is not limited thereto, and may be integrated with a private cloud platform and a distributed file system platform via the DATAM 406 and an authentication service, but the disclosure is not limited thereto.

The process may be executed via the communication module 428 and the communication network 410, which may comprise plural networks as described above. For example, in an exemplary embodiment, the various components of the DATAM 406 may communicate with the server 404, the production database 412(1) and the UAT database 412(2) via the communication module 428 and the communication network 410. Of course, these embodiments are merely exemplary and are not limiting or exhaustive.

According to exemplary embodiments, the communication network 410 and the communication module 428 may be configured to establish a link between the production database 412(1), the UAT database 412(2), the client devices 408(1)-408(n) and the DATAM 406.

According to exemplary embodiments, each of the accessing module 414, generating module 416, analyzing module 418, executing module 420, implementing module 422, aligning module 424, display module 426, and the communication module 428 may be implemented by microprocessors or similar, they may be programmed using software (e.g., microcode) to perform various functions discussed herein and may optionally be driven by firmware and/or software. Alternatively, each of the accessing module 414, generating module 416, analyzing module 418, executing module 420, implementing module 422, aligning module 424, display module 426, and the communication module 428 may be implemented by dedicated hardware, or as a combination of dedicated hardware to perform some functions and a processor (e.g., one or more programmed microprocessors and associated circuitry) to perform other functions. Also, according to exemplary embodiments, each of the accessing module 414, generating module 416, analyzing module 418, executing module 420, implementing module 422, aligning module 424, display module 426, and the communication module 428 may be physically separated into two or more interacting and discrete blocks, units, devices, and/or modules without departing from the scope of the inventive concepts.

According to exemplary embodiments, each of the accessing module 414, generating module 416, analyzing module 418, executing module 420, implementing module 422, aligning module 424, display module 426, and the communication module 428 of the DATAM 406 may also be called by corresponding API, but the disclosure is not limited thereto.

According to exemplary embodiments, the accessing module 414 may be configured to access the production database 412(1) to obtain production data associated with an application and access the UAT database 412(2) to obtain UAT data associated with the application.

According to exemplary embodiments, the generating module 416 may be configured to generate gap data on test coverage based on comparing the production data with the UAT data.

According to exemplary embodiments, the analyzing module 418 may be configured to analyze the generated gap data. The generating module 416 may be configured to automatically generate, in response to analyzing the generated gap data by the analyzing module 418, executable full coverage of test scenarios for testing the application.

According to exemplary embodiments, the executing module 420 may be configured to automatically execute testing of the application based on the generated test scenarios.

According to exemplary embodiments, the implementing module 422 may be configured to implement data analytics algorithm on historical production data to identify unique set of input data, received from a client device, that represents a consumer's point of view for utilization of the application, for automatically generating the full coverage of test scenarios.

According to exemplary embodiments, the implementing module 422 may be further configured to implement the data analytics algorithm on the historical production data to identify unique set of input data; and implement the identified unique set of input data for re-platforming, migrating, and regression testing of the application.

According to exemplary embodiments, the aligning module 424 may be configured to align the full coverage of test scenarios with a test automation framework. The executing module 420 may be configured to automatically execute end-to-end UAT and regression testing of the application based on the test scenarios.

According to exemplary embodiments, the production data may be defined and collected in view of input data, received from a client device (i.e., 408(1)-408(n)), the input data representing a consumer's point of view for utilization of the application.

According to exemplary embodiments, the implementing module 422 may be further configured to implement a GUI 430; and the display module 426 may be configured to display the generated test scenarios and the generated gap data in test coverage onto the GUI 430.

According to exemplary embodiments, the generating module 416 may be further configured to automatically generate test cases and data artefacts based on production events data captured from pre-production environment of a continuous integration continuous delivery pipeline.

Figure 5:
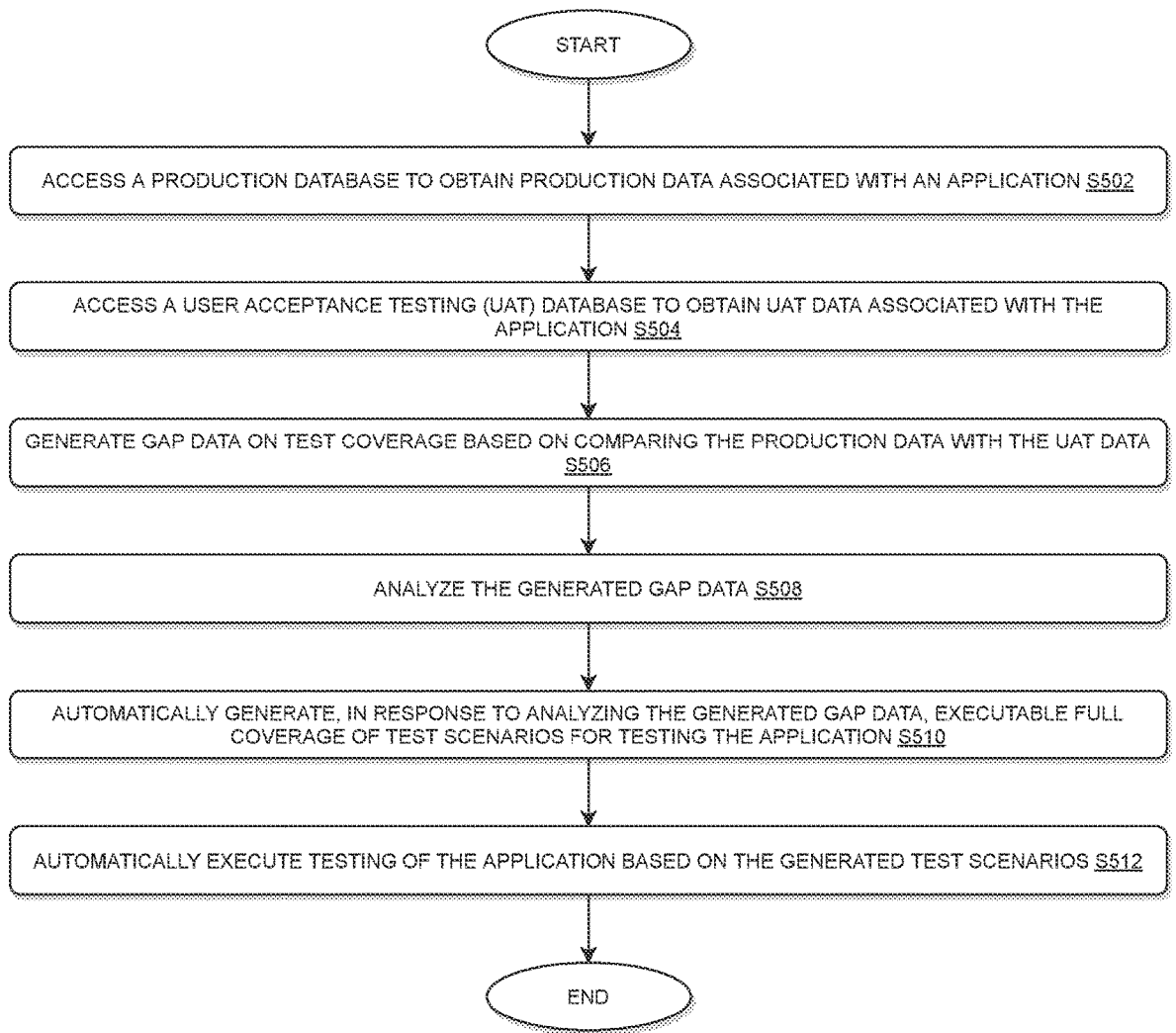
FIG. 5 illustrates a flow diagram for automatically generating fully integrated regression and system testing (FIRST) analytics in accordance with an exemplary embodiment.

FIG. 5 illustrates a flow diagram of a process 500 for automatically generating fully integrated regression and system testing (FIRST) analytics in accordance with an exemplary embodiment.

As illustrated in FIG. 5, at step S502, the process 500 may access a production database to obtain production data associated with an application.

At step S504, the process 500 may access a user acceptance testing (UAT) database to obtain UAT data associated with the application.

At step S506, the process 500 may generate gap data on test coverage based on comparing the production data with the UAT data.

At step S508, the process 500 may analyze the generated gap data.

At step S510, the process 500 may automatically generate, in response to analyzing the generated gap data, executable full coverage of test scenarios for testing the application.

At step S512, the process 500 may automatically execute testing of the application based on the generated test scenarios.

According to exemplary embodiments, the process 500 may further include: implementing data analytics algorithm on historical production data to identify unique set of input data, received from a client device, that represents a consumer's point of view for utilization of the application, for automatically generating the full coverage of test scenarios.

According to exemplary embodiments, the process 500 may further include: implementing the data analytics algorithm on the historical production data to identify unique set of input data; and implementing the identified unique set of input data for re-platforming, migrating, and regression testing of the application.

According to exemplary embodiments, the process 500 may further include: aligning the full coverage of test scenarios with a test automation framework; and automatically executing end-to-end UAT and regression testing of the application based on the test scenarios.

According to exemplary embodiments, the process 500 may further include: aligning the full coverage of test scenarios with a test automation framework; and automatically executing end-to-end non-functional testing of the application based on the test scenarios.

According to exemplary embodiments, the process 500 may further include: implementing a GUI; and displaying the generated test scenarios and the generated gap data in test coverage onto the GUI.

According to exemplary embodiments, the process 500 may further include: automatically generating test cases and data artefacts based on production events data captured from pre-production environment of a continuous integration continuous delivery pipeline.

According to exemplary embodiments, the DATAD 402 may include a memory (e.g., a memory 106 as illustrated in FIG. 1) which may be a non-transitory computer readable medium that may be configured to store instructions for implementing the DATAM 406 for automatically generating fully integrated regression and system testing (FIRST) analytics as disclosed herein. The DATAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DATAM 406 or within the DATAD 402, may be used to perform one or more of the methods and processes as described herein. In a particular embodiment, the instructions may reside completely, or at least partially, within the memory 106, the medium reader 112, and/or the processor 104 (see FIG. 1) during execution by the DATAD 402.

For example, the instructions, when executed, may cause the processor 104 to perform the following: accessing a production database to obtain production data associated with an application; accessing a user acceptance testing (UAT) database to obtain UAT data associated with the application; generating gap data on test coverage based on comparing the production data with the UAT data; analyzing the generated gap data; automatically generating, in response to analyzing the generated gap data, executable full coverage of test scenarios for testing the application; and automatically executing testing of the application based on the generated test scenarios, but the disclosure is not limited thereto.

According to exemplary embodiments, the instructions, when executed, may further cause the processor 104 to perform the following: implementing data analytics algorithm on historical production data to identify unique set of input data, received from a client device, that represents a consumer's point of view for utilization of the application, for automatically generating the full coverage of test scenarios.

According to exemplary embodiments, the instructions, when executed, may further cause the processor 104 to perform the following: implementing the data analytics algorithm on the historical production data to identify unique set of input data; and implementing the identified unique set of input data for re-platforming, migrating, and regression testing of the application.

According to exemplary embodiments, the instructions, when executed, may further cause the processor 104 to perform the following: aligning the full coverage of test scenarios with a test automation framework; and automatically executing end-to-end UAT and regression testing of the application based on the test scenarios.

According to exemplary embodiments, the instructions, when executed, may further cause the processor 104 to perform the following: aligning the full coverage of test scenarios with a test automation framework; and automatically executing end-to-end non-functional testing of the application based on the test scenarios.

According to exemplary embodiments, the instructions, when executed, may further cause the processor 104 to perform the following: implementing a GUI; and displaying the generated test scenarios and the generated gap data in test coverage onto the GUI.

According to exemplary embodiments, the instructions, when executed, may further cause the processor 104 to perform the following: automatically generating test cases and data artefacts based on production events data captured from pre-production environment of a continuous integration continuous delivery pipeline.

According to exemplary embodiments as disclosed above in FIGS. 1-5, technical improvements effected by the instant disclosure may include platforms for implementing a data analytics and test automation module that provides a unified test automation framework thereby reducing the need for multiple tools to support applications developed in diverse technology platforms; supports end to end UAT (User Acceptance Testing), regression and non-functional testing, requirements and test coverage analysis (also referred as fingerprinting); facilitates fully automated test cases creation and data artefacts generation based on production events captured from pre-production environment, and thereby significantly reducing STLC duration, but the disclosure is not limited thereto. For example, according to exemplary embodiments as disclosed above in FIGS. 1-5, technical improvements effected by the instant disclosure may also include platforms for implementing a data analytics and test automation module that utilizes data analytics (fingerprint) on historical production data to identify unique set of inputs for constructing test cases; aligns fingerprinted tests with a test automation framework; and utilizes this approach on a continuous basis to keep the test cases optimized, and maintains test coverage at par with production with minimal efforts (i.e., core part of FIRST analytics is re-usable across business domains), but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically generating fully integrated regression and system testing (FIRST) analytics by utilizing one or more processors and one or more memories, the method comprising:
   accessing a production database to obtain production data associated with an application;
   accessing a user acceptance testing (UAT) database to obtain UAT data associated with the application;
   generating gap data on test coverage based on comparing the production data with the UAT data;
   analyzing the generated gap data;
   automatically generating, in response to analyzing the generated gap data, executable full coverage of test scenarios for testing the application;
   automatically executing testing of the application based on the generated test scenarios; and
   implementing data analytics algorithm on historical production data to identify unique set of input data, received from a client device, that represents a consumer's point of view for utilization of the application, for automatically generating the full coverage of test scenarios.

2. The method according to claim 1, further comprising:
   implementing the data analytics algorithm on the historical production data to identify unique set of input data; and
   implementing the identified unique set of input data for re-platforming, migrating, and regression testing of the application.

3. The method according to claim 1, further comprising:
   aligning the full coverage of test scenarios with a test automation framework; and
   automatically executing end-to-end UAT and regression testing of the application based on the test scenarios.

4. The method according to claim 1, further comprising:
   aligning the full coverage of test scenarios with a test automation framework; and
   automatically executing end-to-end non-functional testing of the application based on the test scenarios.

5. The method according to claim 1, wherein the production data is defined and collected in view of input data, received from a client device, the input data representing a consumer's point of view for utilization of the application.

6. The method according to claim 1, further comprising:
   implementing a graphical user interface (GUI); and
   displaying the generated test scenarios and the generated gap data in test coverage onto the GUI.

7. The method according to claim 1, further comprising:
   automatically generating test cases and data artefacts based on production events data captured from pre-production environment of a continuous integration continuous delivery pipeline.

8. The method according to claim 1, further comprising:
   generating test results based on executing the testing of the application;
   sending an electronic notification of the test results to a user; and
   receiving user feedback data on the test results.

9. A system for automatically generating fully integrated regression and system testing (FIRST) analytics, the system comprising:
   a production database having one or more memories for storing production data associated with an application;
   a user acceptance testing (UAT) database having another one or more memories for storing UAT data associated with the application; and
   a processor operatively connected to the production database and the UAT database via one or more communication networks, wherein the processor is configured to:
   access the production database to obtain the production data associated with the application;
   access the user acceptance testing (UAT) database to obtain the UAT data associated with the application;
   generate gap data on test coverage based on comparing the production data with the UAT data;
   analyze the generated gap data;
   automatically generate, in response to analyzing the generated gap data, executable full coverage of test scenarios for testing the application;
   automatically execute testing of the application based on the generated test scenarios; and
   implement data analytics algorithm on historical production data to identify unique set of input data, received from a client device, that represents a consumer's point of view for utilization of the application, for automatically generating the full coverage of test scenarios.

10. The system according to claim 9, wherein the processor is further configured to:
    implement the data analytics algorithm on the historical production data to identify unique set of input data; and
    implement the identified unique set of input data for re-platforming, migrating, and regression testing of the application.

11. The system according to claim 9, wherein the processor is further configured to:
    align the full coverage of test scenarios with a test automation framework; and
    automatically execute end-to-end non-functional testing of the application based on the test scenarios.

12. The system according to claim 9, wherein the production data is defined and collected in view of input data, received from a client device, the input data representing a consumer's point of view for utilization of the application.

13. The system according to claim 9, wherein the processor is further configured to:
    implement a graphical user interface (GUI); and
    display the generated test scenarios and the generated gap data in test coverage onto the GUI.

14. The system according to claim 10, wherein the processor is further configured to:
    automatically generate test cases and data artefacts based on production events data captured from pre-production environment of a continuous integration continuous delivery pipeline.

15. A non-transitory computer readable medium configured to store instructions for automatically generating fully integrated regression and system testing (FIRST) analytics, wherein, when executed, the instructions cause a processor to perform the following:

accessing a production database to obtain production data associated with an application;

accessing a user acceptance testing (UAT) database to obtain UAT data associated with the application;

generating gap data on test coverage based on comparing the production data with the UAT data;

analyzing the generated gap data;

automatically generating, in response to analyzing the generated gap data, executable full coverage of test scenarios for testing the application;

automatically executing testing of the application based on the generated test scenarios; and implementing data analytics algorithm on historical production data to identify unique set of input data, received from a client device, that represents a consumer's point of view for utilization of the application, for automatically generating the full coverage of test scenarios.

16. The non-transitory computer readable medium according to claim 15, wherein the instructions, when executed, causes the processor to further perform the following:

implementing the data analytics algorithm on the historical production data to identify unique set of input data; and implementing the identified unique set of input data for re-platforming, migrating, and regression testing of the application.

17. The non-transitory computer readable medium according to claim 15, wherein the instructions, when executed, causes the processor to further perform the following:

aligning the full coverage of test scenarios with a test automation framework; and automatically executing end-to-end UAT, non-functional testing of the application based on the test scenarios.

18. The non-transitory computer readable medium according to claim 15, wherein the instructions, when executed, causes the processor to further perform the following:

automatically generating test cases and data artefacts based on production events data captured from pre-production environment of a continuous integration continuous delivery pipeline.

19. The non-transitory computer readable medium according to claim 15, wherein the production data is defined and collected in view of input data, received from a client device, the input data representing a consumer's point of view for utilization of the application.

20. The non-transitory computer readable medium according to claim 15, wherein the instructions, when executed, causes the processor to further perform the following:

generating test results based on executing the testing of the application;

sending an electronic notification of the test results to a user; and receiving user feedback data on the test results.

\* \* \* \* \*